United States Patent [19]

Satoh et al.

[11] 4,448,627

[45] May 15, 1984

[54] APPARATUS FOR APPLYING A RUBBER SHEET ONTO A TIRE MAKING DRUM

[75] Inventors: Kazuo Satoh, Kobe; Tsutomu Nosaka, Hyogo, both of Japan

[73] Assignee: Sumitomo Rubber Industries, Ltd., Kobe, Japan

[21] Appl. No.: 413,436

[22] Filed: Aug. 31, 1982

[30] Foreign Application Priority Data

Sep. 9, 1981 [JP] Japan .................. 56-142799

[51] Int. Cl.$^3$ .................. B29H 17/18; B29H 17/02
[52] U.S. Cl. .................. 156/405.1; 83/276;
156/408; 156/412; 156/446; 156/510; 198/811;
226/97; 493/112; 493/287; 493/303
[58] Field of Search ............. 156/394.1, 405.1, 406.4,
156/408, 412, 414, 446, 510; 83/277, 276, 402,
83/175; 226/97, 95, 93, 152, 118, 119; 198/811;
493/287, 303, 112, 340

[56] References Cited

U.S. PATENT DOCUMENTS 3,057,397 10/1962 Riddle et al. .................. 156/405.1
3,556,902 1/1971 Cole ........................... 156/412
3,841,941 10/1974 Leblond et al. ............ 156/405.1 X Primary Examiner—William A. Powell
Assistant Examiner—Thomas Bokan
Attorney, Agent, or Firm—Wenderoth, Lind & Ponack

[57] ABSTRACT

This invention relates to an apparatus for applying mainly a thin rubber sheet, such as an inner liner or insulation, onto a tire making drum, which is used in a series of raw tire making processes. The apparatus can realize a proper applying of the sheet in such a manner that the rubber sheet, not previously cut to a specified length although it is longer than the circumference of the drum, is pressed at the foremost end onto the tire making drum, is applied thereto in a length corresponding to about one circumference of the drum through rotary control thereof, is thereafter cut automatically to the specified length, and is subsequently applied at the rear end of the cut sheet onto the drum.

2 Claims, 3 Drawing Figures

APPARATUS FOR APPLYING A RUBBER SHEET ONTO A TIRE MAKING DRUM

BACKGROUND OF THE INVENTION

1. Field of the Invention

This invention relates to an apparatus for applying mainly a thin rubber sheet, e.g., an inner liner or insulation, onto a tire making drum, which is included in a series of raw tire making processes.

2. Description of the Prior Art

Conventionally, a rubber sheet is cut on a conveyor disposed close to a tire making drum and to a specified length corresponding to one circumference of the tire making drum and the cut rubber sheet is fed thereto by synchronization of the conveyor speed with the circumferential speed of the tire making drum and then applied to the drum. This method has been proposed for applying the rubber sheet, such as an inner liner, onto the tire making drum for making the raw tire.

Such method, however, is defective in that (1) a thin rubber sheet, especially such as an inner liner or insulation, has a strong tendency to shrink while being left as it is for a fixed time period after being cut in a specified length, whereby disparity in its dimension makes it difficult to complete the joint work with accuracy, (2) the cut edge of rubber sheet when cut on the conveyor to a specified length adheres to a knife receiving block or a knife-edge, resulting in an unreliable feed of rubber sheets, and (3) it is not always easy to strictly synchronize the circumferential speed of the tire making drum with the conveyor speed for feeding the rubber sheet cut to a specified length to the tire making drum on which the rubber sheet is to be applied (if improper in synchronization, shrinkages will be created in the rubber sheet when applied).

SUMMARY OF THE INVENTION

After conducting research for a way of eliminating the above defect in the conventional process, the inventor has discovered that proper applying of the rubber sheet is realizable in such a manner that the long rubber sheet is not previously cut to a specified length, but is applied onto the tire making drum by a length corresponding nearly to the circumference of the drum by rotary-control of the drum at a predetermined angle, and thereafter the sheet is cut automatically to a specified length and applied at the cut end to the drum, thereby actually properly applying the sheet thereto.

BRIEF DESCRIPTION OF THE DRAWINGS

Next, an embodiment of the present invention will be detailed in accordance with the drawings, in which.

DETAILED DESCRIPTION OF PREFERRED EMBODIMENT

Figure 1:
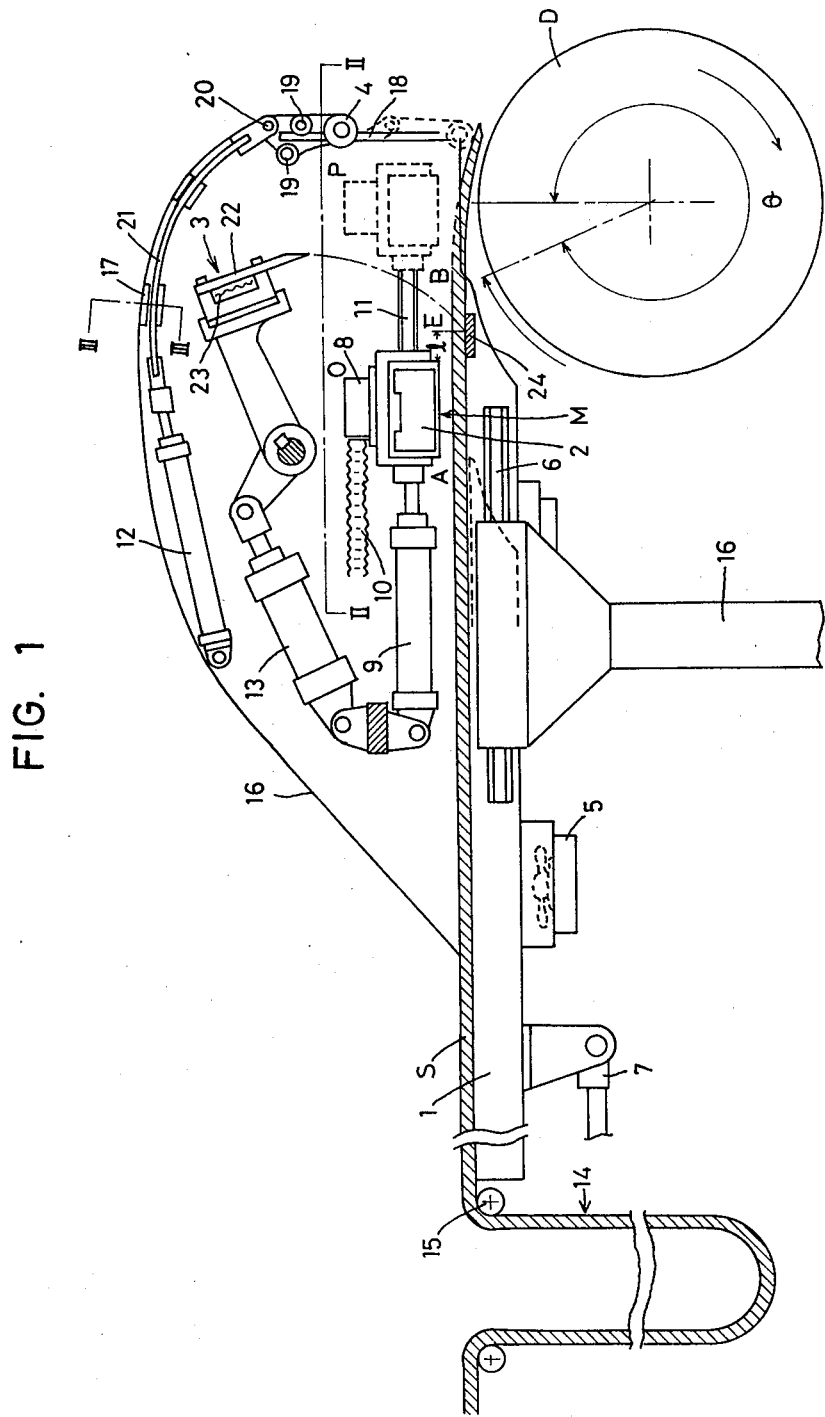
FIG. 1 is a side view of an embodiment of the invention.

A rubber sheet applying apparatus of the invention, as shown in FIG. 1, comprises a main frame 1, a tire making drum D, a sheet attracting and transfer mechanism M, a cutter 3, a sheet initial end pressing roller 4, and a blower 5.

The main frame 1 is formed in a pneumatic table, into which a blower 5 of well-known construction is encased, so that a rubber sheet S is floated slightly above the main frame 1 by an air blast from the blower 5 and travels without any frictional resistance. The main frame 1 also is made movable forwardly and backwardly between the point A (the backward position shown in the dotted line) and point B (the forward position) by a drive cylinder 7 through a slide guide 6 with respect to the tire making drum D rotatably provided. In addition, reference numeral 16 designates a pedestal for supporting the main frame 1.

At the rear of the main frame 1, a festoon portion 14 of the rubber sheet S is formed through guide rollers 15 housing therein a one-way clutch means, the festoon portion 14 corresponding to a part of the rubber sheet S in length more than the circumference of the tire making drum D so that a long rubber sheet S placed on the main frame 1 is subjected always to a slight back tension by the weight of the festoon 14.

Figure 2:
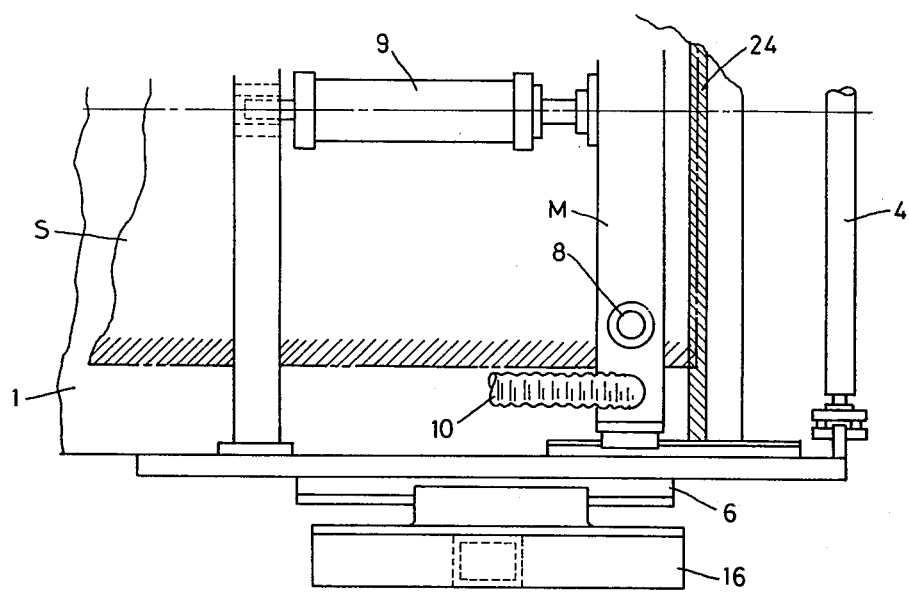
FIG. 2 is a plan view taken on the line II—II in FIG. 1.
Figure 3:
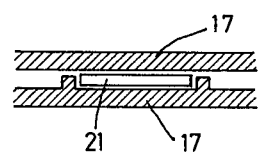
FIG. 3 is a sectional view taken on the line III—III in FIG. 1.

The sheet attracting and transfer mechanism M, as shown in FIGS. 1 and 2, is disposed on the main frame 1 and has an attraction box 2 which connects with a vacuum suction hose 10. The mechanism M is movable vertically by a cylinder 8 and is movable forwardly and backwardly between the point P (forward position shown in dashed lines) and the point O (backward position shown in solid lines) along a slide guide 11 by a cylinder 9. The attraction box 2, at the point O, attracts the rubber sheet S in the vicinity of the initial end thereof, for example, at the position near to the cut end E at a distance l (e.g. about 15 mm).

If the distance l is too large, the rubber sheet S, when transferred and applied at the initial end, will bend, and if too short, will not contact a press-roller 4 to be discussed below.

Also, the attraction box 2 is adapted to press the rubber sheet S at the forward point P corresponding vertically to the center of drum D and then releases the sheet.

The sheet initial end pressing roller 4, as shown in FIG. 1, is a freely rotatable roller connected to a cylinder 12 through guide wheels 19 engageable with a guide rod 18. The pressing roller 4 is vertically movable by the cylinder 12 along the guide rod 18 with respect to the tire making drum D and descends to intensely press-contact the initial end of the rubber sheet S onto the surface of the drum D.

In addition, the pressing roller 4 is made from sponge or rubber, and need only be well fitted to the curved surface of the drum D.

The tire making drum D has a rotary angle control mechanism (not shown) composed mainly of a well-known pulse generator and a pulse counter. When the drum D rotates at a desired rotary angle $\theta°$ (e.g. 300°) to apply therearound the rubber sheet S in length corresponding to about one circumference of drum D, a pulse signal corresponding to the angle $\theta°$ is generated from the pulse generator and read by the pulse counter to thereby stop a main motor and stop the rotation of the drum D.

In other words, the rotary angle of the drum D is controlled so that the length of the rubber sheet S applied between the initial end and the position where the rubber sheet S is cut to a specified length, becomes equal to the sum of length corresponding to the circumference of the drum D and an amount (length) of a desired overlapped joint.

The cutter 3 is disposed above the sheet attracting and transfer mechanism M and a knife 22 vertically swings through a cylinder 13 and moves downwardly to press-cut the rubber sheet S at the cut end point E (i.e. to the specified length) on the main frame 1, at which time the attraction box 2 lowers itself to push and fix the rubber sheet S onto the main frame 1, whereby proper cutting is carried out without an undesirable shift in the rubber sheet S (e.g. off-center). The knife 22 houses therein a heater 23. Alternatively, a pair of right-hand and left-hand knives (not shown) may be operated by, for example, a rack-pinion mechanism to move in synchronism with each other and also to move width-wise outwardly from the center of the rubber sheet S, thereby cutting it.

In addition, the knife 22 rises, not immediately after the cutting, but only after the rear end of the cut rubber sheet S is joined with the initial end thereof. The reason for this arrangement is that, if the knife 22 is allowed to rise just after the cutting, the rear end of the cut rubber sheet S rises following the knife 22 so as to cause the cut rubber sheet S to be off-center.

The rubber sheet applying apparatus of the invention will operate as follows:

The tire making drum D is at the start position (corresponding to the forward point P of the mechanism M) and the long rubber sheet S is afloat always slightly above the main frame 1 at its backward position A. The long rubber sheet S keeps its initial end at the cut end point E (cutting position) and is subjected always to light back tension by the rear festoon 14.

The cylinder 7 moves forwardly to allow the main frame 1 to travel from the backward position A to the forward position B and to stop when its front end arrives in close proximity to the tire making drum D.

Next, the attraction box 2 above the main frame 1 lowers itself through forward movement of the cylinder 8 and presses the initial end of the rubber sheet S onto the main frame 1, at which time the vacuum suction hose 10 attracts the rubber sheet S to the lower surface of the attraction box 2. Then, the cylinder 8 operates to raise the attraction box 2, keeping therewith the rubber sheet S in order to return it to the original position. At the same time, the attraction box 2 moves forwardly through operation of cylinder 9 along the slide guide 11 and reaches the forward position P vertically corresponding to the center of the drum D and then stops. Next, the cylinder 8 operates to lower the attraction box 2, whereby the rubber sheet S, attracted to the lower surface thereof, is pressed onto the drum D, at which time the cylinder 12 operates to lower the sheet initial end pressing roller 4 along the guide rod 18, thereby intensely pressing onto the drum D the initial end (about 15 mm) of the rubber sheet S coming out of the attraction box 2. Upon pressing the initial end of the rubber sheet S onto the tire making drum D by the roller 4, the attraction box 2 releases its attraction and is raised by the cylinder 8 before being restored to its original position (the position O) by the cylinder 9. In the above condition of pressing the rubber sheet S onto the tire making drum D by the roller 4, the drum D rotates at a predetermined angle $\theta°$ to apply the rubber sheet S in length corresponding to nearly one circumference of the drum D. In this instance, the rubber sheet S, which is moved floating above the main frame 1 toward the tire making drum D, is not subjected to any force caused by friction, but is given slight back tension by the weight of the festoon 14 at the rear end of main frame 1, thereby performing the applying step sufficiently and exactly without creating shrinkages. Upon stopping the tire making drum D at the predetermined angle $\theta°$, the cutter 3 disposed on the upper part of attraction box 2 is moved downwardly by the cylinder 13 to cut by its hot knife 22 the rubber sheet S on the knife receiving block 24.

At this time, the attraction box 2 in the rising position at the original position O lowers through operation of cylinder 8 to press onto the drum D the rubber sheet S at the rear end of the cut end position E, whereby there is no fear of shifting the rubber sheet S to cause the off-center during the cutting step.

After completion of the cutting step, the drum D restarts rotation while keeping the hot knife 22 in cutting condition, and then the rear end of the cut rubber sheet S is pressed by the roller 4 onto the drum D. An overlap joint is then formed with the initial end of the cut rubber sheet S.

At this time, the joint portion is overlapped to be twice as thick as the thickness of the uncut rubber sheet S, but the press roller 4 squashes the thickened portion to form a properly sized joint.

After the rubber sheet S is jointed, the hot knife 22 moves upwardly, but the attraction box 2 still presses the rubber sheet S, thereby preventing the rear end of the cut rubber sheet S from rising to follow the hot knife 22, thus causing no off-center.

The present invention constructed as indicated above is advantageous in the following respects.

(1) There is not found any shrinkage, in other words, disparity in dimension, of the rubber sheet S previously cut to a specified length and applied to the drum 4 as in the conventional method.

(2) Since the rubber sheet S is afloat always in the air, there is no fear of adherence of the sheet S, when cut, to the knife 22 or the knife receiving block 24, and the rubber sheet S is not affected by winding waviness so that the automatic applying step is stabilized.

(3) The rubber sheet S, when applied to the tire making drum 4, is subjected to light and constant back tension (a pulling force), thereby being applied sufficiently and exactly without creating shrinkage.

(4) A conveyor for stocking the previously cut rubber sheets S as in the conventional method is not required, thereby making the equipment of the present invention more compact than known prior art devices.

In addition, the apparatus of the invention is applicable to the automatic applying of sidewalls other than the inner liners or insulations for the tire being made.

What is claimed is:

1. An apparatus for applying a rubber sheet onto a tire making drum comprising:
   a movable main frame,
   a tire making drum for applying thereto a rubber sheet, provided rotatably in the vicinity of one end of the movable main frame,
   a sheet attracting and transferring means, located adjacent to the movable main frame, for attracting a long rubber sheet in the vicinity of its initial end and for transferring the long rubber sheet to the tire making drum,
   a press roller means, disposed adjacent to the tire making drum, for press-contacting the initial end of the long rubber sheet onto the tire making drum, and
   a cutter means for subsequently cutting the long rubber sheet, already applied onto said tire making drum, to a length corresponding to about one circumference of the tire making drum, said cutter means being provided adjacent to the sheet attracting and transferring means.

2. An apparatus for applying a rubber sheet onto a tire making drum according to claim 1, further comprising:

a pneumatic table, formed at the surface of the movable main frame, and guide roll means, housing therein one-way clutch means, for forming at a rear portion of the movable main frame a festoon portion in the long rubber sheet.

* * * * *